United States Patent [19]

Eblen et al.

[11] Patent Number: 4,620,195

[45] Date of Patent: Oct. 28, 1986

[54] METHOD OF FABRICATING AN INK DROPLET GENERATOR FOR AN INK JET PRINTER AND INK DROPLET GENERATOR FABRICATED THEREBY

[75] Inventors: Otto Eblen, Constance; Gerhard Glöckler, Orsingen; Franz Kohler, Meersburg; Norbert Meinusch, Stockach, all of Fed. Rep. of Germany

[73] Assignee: Contraves GmbH, Haar/Munich, Fed. Rep. of Germany

[21] Appl. No.: 700,522

[22] Filed: Feb. 11, 1985

[30] Foreign Application Priority Data

Feb. 27, 1984 [CH] Switzerland .......................... 939/84

[51] Int. Cl.⁴ .......................................... G01D 15/18

[52] U.S. Cl. ....................................... 346/1.1; 346/75; 346/140 R

[58] Field of Search .......................... 346/1, 75, 140 IJ

[56] References Cited

U.S. PATENT DOCUMENTS 4,121,223 10/1978 Omori et al. .......................... 346/75

4,338,612 7/1982 Nagayama ............................ 346/75

4,368,476 1/1983 Uehara et al. .................... 346/75 X 4,568,946 2/1986 Weinberg ............................. 346/75

*Primary Examiner*—George H. Miller, Jr.

*Attorney, Agent, or Firm*—Werner W. Kleeman

[57] ABSTRACT

A method is proposed for fabricating components of an ink droplet generator for generating a sequence of charged, detected and deflected ink droplets for an ink jet printer, as is proposed an ink droplet generator fabricated thereby. The method which is based upon multilayer technology involves forming the charging electrodes and the detection electrodes by removing unnecessary metal coating from a support element metallically coated on at least one side of the support element and forming the deflection electrodes by removing unnecessary metal coating from a polyimide foil coated on at least one side thereof. The polyimide foil is mounted on a substrate constructed as a support element. The arrangement defining the ink droplet generator comprises a first module formed from both board or panel-like support elements and a second module formed from both board or panel-like support elements.

21 Claims, 9 Drawing Figures

FIG. 1
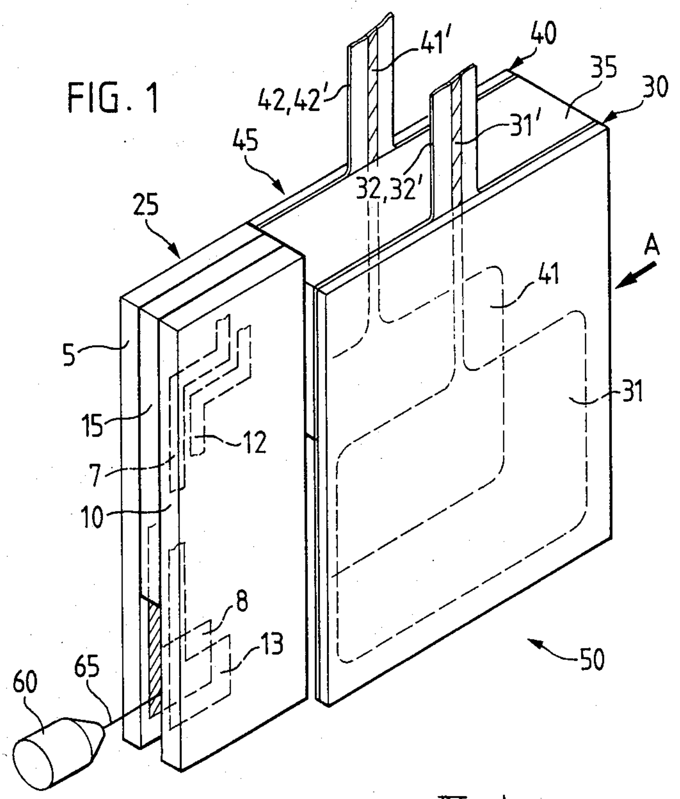
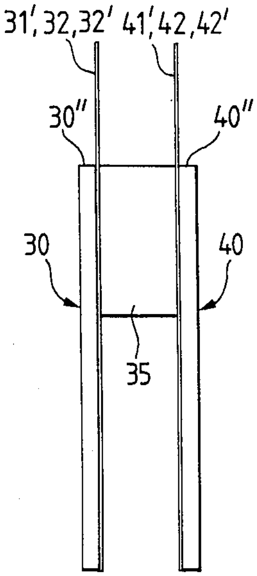
FIG. 3
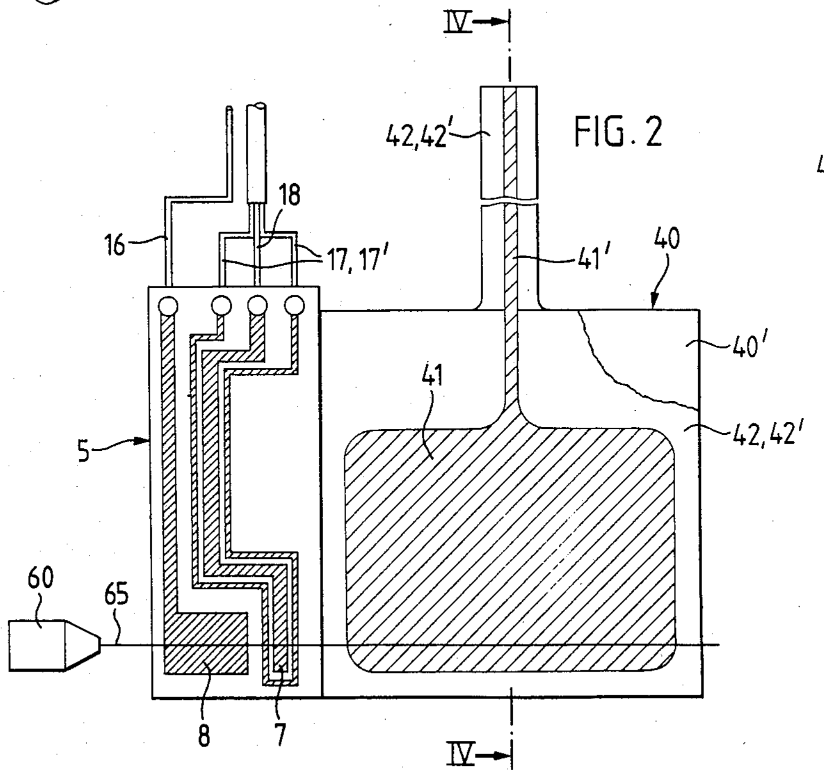
FIG. 2
FIG. 4
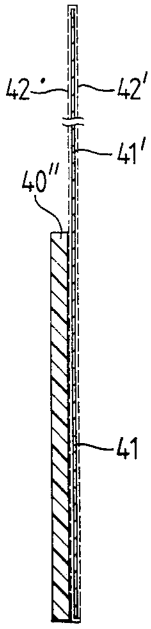

METHOD OF FABRICATING AN INK DROPLET GENERATOR FOR AN INK JET PRINTER AND INK DROPLET GENERATOR FABRICATED THEREBY

CROSS REFERENCE TO RELATED APPLICATION

This application is related to the commonly assigned, copending U.S. application Ser. No. 06/689,570 filed Jan. 7, 1985, entitled "Method and Apparatus for the Supply System of an Ink Jet Printer".

BACKGROUND OF THE INVENTION

The present invention broadly relates to ink jet printers and, more specifically, pertains to a new and improved method of fabricating component parts of an ink droplet generator for generating a sequence of charged, detected and deflected ink droplets for an ink jet printer as well as an arrangement of the components of such ink droplet generator.

Generally speaking, the method of the present invention is for fabricating an ink droplet generator for an ink jet printer wherein a succession of ink droplets is charged, detected or monitored and deflected, while the arrangement of the present invention, namely the ink droplet generator comprises electrode means for the ink droplet generator, of the ink jet printer for generating a succession of charged, detected or monitored and deflected ink droplets.

In the development of ink jet printers with a high ink droplet frequency and a high ink droplet velocity, an electromagnetic device provided with appropriate means is required. Individual ink droplets are charged, detected or monitored and deflected by a device associated with an ink jet propulsion member or nozzle to create a character image or data pattern at an appropriately designated character position or data field.

In known devices and arrangements, due to the relatively aggressive ink media which also leads to chemical reactions, the electronic means arranged relatively close together can smear and plug up or clog and thereby cause an electrical short-circuit. Such known ink jet printers are often rendered inoperative or even completely unusable by such malfunctions. Furthermore, these prior art devices have a relatively complicated structure and are not suited for an arrangement of a plurality of ink jet propulsion members or nozzles in mutual close proximity as is required, for instance, in ink jet printers for generating continuous graphic representations, or can only be made suitable for such arrangement by employing complex technology.

SUMMARY OF THE INVENTION

Therefore, with the foregoing in mind, it is a primary object of the present invention to provide a new and improved method of fabricating components of an ink droplet generator of an ink jet printer and a new and improved ink droplet generator containing such fabricated components which do not exhibit the aforementioned drawbacks and shortcomings of the prior art constructions.

Another and more specific object of the present invention aims at providing a new and improved method of fabricating components of an ink droplet generator of an ink jet printer and an improved ink droplet generator constructed from such fabricated components which permit, on the one hand, the functionally reliable generation of charged, monitored or detected and deflected ink droplets and, on the other hand, the reliable generation of continuous graphic representations in an ink jet printer.

A further significant object of the present invention aims at providing a new and improved ink droplet generator of the character described which is relatively simple in construction and design, extremely economical to manufacture, highly reliable in operation, not readily subject to breakdown and malfunction and requires a minimum of maintenance and servicing.

Now in order to implement these and still further objects of the invention, which will become more readily apparent as the description proceeds, the method of the present invention is manifested by the features that: the means provided for charging, detecting or monitoring and deflecting the ink droplets are formed in a predetermined desired configuration and in mutual electrical isolation by removing unrequired electrically conductive superstrate of metallically coated or plated elements; a first means defining the charging means are formed as charging electrodes, a second means defining the detecting means are formed as detection or monitoring electrodes, and a third means defining the deflection means are formed as deflection electrodes; and a foil or insulating layer resistant to organic or inorganic media, or both, is applied to at least one side of each of the individual first, second and third means and which at least one side is wetted by the ink droplet medium.

In other words, the method of the present invention is manifested by the features that it comprises the steps of: forming and appropriately configuring mutually electrically isolated charging electrode means for imparting an electrostatic charge to the ink droplets by removing undesired portions of a conductive superstrate of at least one circuit board; forming and appropriately configuring mutually electrically isolated detection electrode means for monitoring the ink droplets by removing undesired portions of a conductive superstrate of at least one circuit board; forming and appropriately configuring mutually electrically isolated deflection electrode means for deflecting the ink droplets into a desired trajectory by removing undesired portions of a conductive superstrate of at least one circuit board; each of the charging electrode means, the detection electrode means and the deflection electrode means having a side which is wetted in the ink jet printer by the ink droplets; and applying a protective layer resistant to organic and inorganic agents to the wetted sides.

The ink droplet generator of the present invention is manifested by the features that it comprises a first module with two first support panels or panel-like support elements arranged in mutually spaced relationship by a spacer component and provided with the charging and detection electrodes and a second module with two support panels or panel-like second support elements arranged in mutually spaced relationship by a spacer component and provided with the deflection electrodes.

In other words, the arrangement of the present invention is manifested by the features that it comprises: a first module comprising a first spacer component and first and second rigid support panels arranged in mutually spaced relationship by the first spacer component; a first charging electrode for imparting an electrostatic charge to the ink droplets and a first detection electrode for detecting the electrostatically charged ink droplets, both formed in mutual electrical isolation upon a first side of the first rigid support panel of the first module; a second charging electrode for imparting an electrostatic charge to the ink droplets and a second detection electrode for detecting the electrostatically charged ink droplets, both formed in mutual electrical isolation upon a first side of the second rigid support panel of the first module; a second module comprising a second spacer component and third and fourth rigid support panels arranged in mutually spaced relationship by the second spacer component; a first deflection electrode for deflecting the electrostatically charged ink droplets into a desired trajectory and formed upon the third rigid support panel of the second module; and a second deflection electrode for deflecting the electrostatically charged ink droplets into a desired trajectory and formed upon the fourth rigid support panel of the second module.

A particular advantage which ensues from the method of the present invention is that the means for generating the charged, monitored and deflected ink droplets can be fabricated economically and with optimum electrical properties by employing known circuit board fabrication technology. A further advantage consists in that a substantially narrower and smaller structural form is achieved due to the board or panel-like means or components as contrasted to the cumbersome means known heretofore. A substantial advantage furthermore consists in that a plurality of ink jet propulsion members or nozzles can be arranged in mutually close spacing when both support elements containing the ink droplet deflection means are fabricated in sandwich construction. Continuous graphic representations are then attainable without further technological expense.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 1 schematically shows a perspective representation of an ink droplet generator having means for charging, monitoring and deflecting ink droplets in an ink jet printer;

FIG. 2 schematically shows a sectional view of one half of the ink droplet generator formed from a first and a second module as depicted in FIG. 1;

FIG. 3 schematically shows the second module in end view as seen in the direction of the arrow A in FIG. 1;

FIG. 4 schematically shows one half of the second module viewed in section taking along the line IV—IV in FIG. 2;

DETAILED DESCRIPTION OF THE PREFERRED EMBODIMENTS

Figure 5:
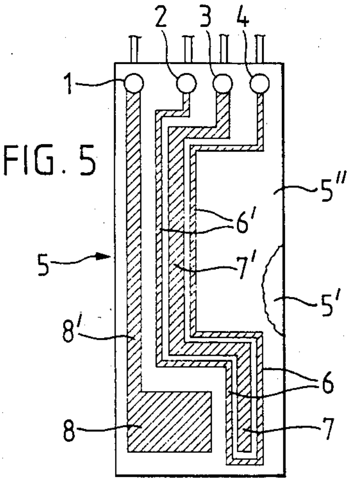
FIGS. 5 through 8 schematically show details of the first module in frontal view.

Describing now the drawings, it is to be understood that to simplify the showing thereof only enough of the structure of the ink droplet generator for an ink jet printer has been illustrated therein as is needed to enable one skilled in the art to readily understand the underlying principles and concepts of this invention. Turning now specifically to FIG. 1 of the drawings, the apparatus illustrated therein by way of example and not limitation and fabricated by the method as hereinbefore described will be seen to comprise an ink droplet generator or arrangement 50 composed of predetermined component parts or means for charging, detecting or monitoring and deflecting ink droplets in an ink jet printer. The ink droplet generator or arrangement 50 comprises a first module 25 with means for charging and detecting or monitoring ink droplets as well as a second module 45 with means for deflecting the ink droplets. A schematically represented ink jet propulsion member or nozzle 60 is further visible in FIG. 1.

The ink droplet generator or arrangement 50 is supplied with a number of ink droplets, simply represented by a line 65 in FIG. 1, by the ink jet propulsion member or nozzle 60. In this known procedure, the ink droplets follow a trajectory through the first module 25, which is formed substantially from two board or panel-like support elements 5 and 10 arranged in mutually spaced relationship by a spacer component 15, as well as through the second module 45, which is substantially formed from two board or panel-like support elements 30 and 40 arranged in mutually spaced relationship by a spacer component 35.

FIG. 2 shows a portion of the ink droplet generator or arrangement 50 in sectional view without the two spacer components 15 and 35. The support element 5 of the first module 25 as well as the support element 40 of the second module 45 are visible. The support element 40 of the second module 45 is represented in FIG. 4 in section taken along the line IV—IV in FIG. 2.

The second module 45 is represented in FIG. 3 in an end view taken in the direction of the arrow A in FIG. 1. Both support elements 30 and 40 arranged in mutually spaced relationship by the spacer component 35 are visible.

Details of the first module 25 will be described in the following in relation to FIGS. 5 through 8 and details of the second module 45 will be described in relation to FIGS. 2 and 4.

FIG. 5 shows the first support element 5 in side view. This first support element 5 is formed from a polyimide substrate provided with a superstrate of metal coating or plating, such as copper or silver-plated copper. The means for charging and detecting or monitoring the ink droplets are formed by removing unrequired superstrate in the desired configuration from one surface or face 5′. A charging electrode is designated with the reference numeral 8 and a detection or monitoring electrode is designated with the reference numeral 7 in FIG. 5. The detection or monitoring electrode 7 is preferably surrounded by an electromagnetic interference shielding 6 formed from the superstrate and is thereby isolated from the charging electrode 8, on the one hand, and from a deflection electrode 41 (cf. FIG. 2) of the second module 45, on the other hand. The elements 6, 7 and 8 are connected with an electrical connection location or terminals 1, 2, 3 and 4 by means of appropriately formed and appropriately mutually arranged conductive traces or current paths 6′, 7′ and 8′.

Figure 7:
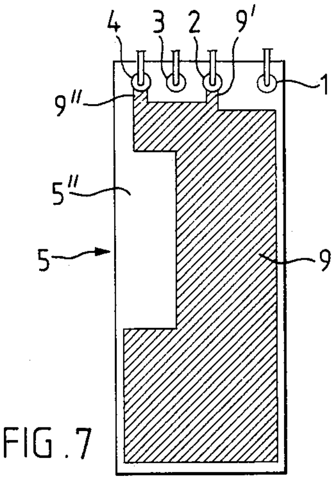

FIG. 7 shows the other surface or face of the first support element 5, which is also provided with a superstrate of metal coating or plating, such as copper or silver-plated copper, not particularly designated. An electromagnetic interference shielding 9 is provided on this surface by removing unrequired superstrate. The electromagnetic interference shielding 9 corresponds in its external configuration to the electrode means 6 through 8 provided on the other surface or face (cf. FIG. 5). The electromagnetic interference shielding 9 is further connected to the electrical connections or terminals 2, 3, and 4 by means of two conductive traces or current paths 9' and 9'' formed from the superstrate.

Figure 6:
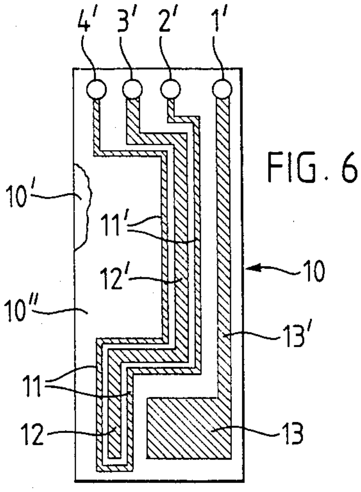
Figure 8:
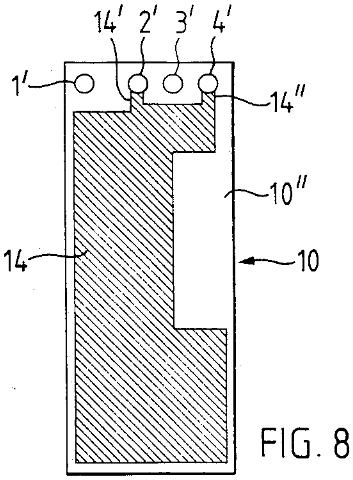

The second support element 10 is represented in FIGS. 6 and 8. This second support element 10 is also formed from a polyimide substrate coated or plated with metal, such as copper or silver-plated copper. The electrode means 11, 11'; 12, 12' and 13, 13' are provided on one surface or face 10' by removing unrequired superstrate and an electromagnetic interference shielding 14 configured in correspondence to the electrode means 11, 11'; 12, 12' and 13, 13' is provided on the other not particularly designated surface or face. The electromagnetic shielding 14 is connected to electrical connections or terminals 2' and 4' by conductive traces or current paths 14', 14''. The first charging electrode 8 formed upon the first support element 5 carries a first charging potential and the first detection electrode 7 formed upon the first support element 5 carries a first detecting potential. These first charging and detecting potentials may be equal in value. The second charging electrode 13 formed upon the second support element 10 carries a second charging potential and the second detection electrode 12 formed upon the second support element 10 carries a second detecting potential. These second charging and detection potentials, while advantageously different from the first charging and detecting potentials, may be equal to one another.

The electrically conductive and insulative means 6, 6'; 7, 7'; 8, 8'; 9, 9''; 11, 11'; 12, 12'; 13, 13' and 14, 14', 14'' formed substantially from the superstrate of metal coating or plating are shown cross-hatched in FIGS. 2 and 5 through 8 for better representational clarity. The electrically conductive means provided on each surface of the individual support elements 5 and 10 and having a thickness in the $\mu$-range are insulated from one another by applying a foil resistant to organic and inorganic media, especially by applying a preferably transparent foil 5'', 10'' resistant to ketone fluid to both support elements 5 and 10 of the first module 25. The individual support elements 5, 10 can be formed as hermetically sealed units by applying the foil 5'', respectively 10'', on both sides.

The half of the second module 45 seen in section in FIG. 2 shows the support element 40 formed from a substrate 40''. The support element 40 is provided with a polyimide foil 42 having a superstrate of metallic coating or plating, such as copper or silver-plated copper. The deflection electrode 41 formed as a field sector as well as the conductive trace or current path 41' formed as a current lead are formed by removing unrequired superstrate. The foil 42 has the external configuration of the support element 40' in its lower region and is formed somewhat wider on both sides than the conductive trace or current path 41' in its upper region. A transparent polyimide foil 42' for electrically insulating the deflection electrode 41 as well as the conductive trace or current path 41' is applied to the first foil 42. The transparent foil 42' substantially conforms to the external configuration of the first polyimide foil 42.

The support element 40 fabricated in sandwich construction is schematically shown in FIG. 4 in section taken along the line IV—IV. The substrate 40'' as well as the polyimide foil 42 applied thereto, the components 41, 41' as well as the second foil 42' are visible. The foils 42, 42' are represented in dotted line in FIG. 4 for improved clarity. The first support element 30 of the second module 45 is formed analogously to the previously described support element 40. The deflection electrode 41 formed on the foil 42 carries a first deflection potential and a corresponding deflection electrode 31 formed on a confronting foil 32 carries a second deflection potential.

It will be understood that both foils 42, 42' are shown partially broken away in FIG. 2 and the foils 5'' and 10'' are shown partially broken away in FIGS. 5 and 6 for better representational clarity.

The ink droplet generator or arrangement 50 substantially comprising both modules 25 and 45 forms a unit as represented in FIG. 1 and can be fastened to a not particularly shown conventional support member with relatively simple means. In the assembled state, both charging electrodes 8, 13 and both detection or monitoring electrodes 7, 12 of the first module 25 as well as the deflection electrodes 41, 31 of the second module 45 are arranged in mirror image relationship to one another as partially indicated in FIG. 1.

In a not particularly shown embodiment, the second module 45 is arranged staggered in height in relation to the first module 25 such that the ink droplet stream or jet 65 emitted by the ink jet propulsion member or nozzle 60 has a trajectory passing approximately through the middle region of both deflection electrodes 31, 41 arranged in mirror image relationship to one another and is deflected at that region into a desired trajectory.

Furthermore, in the assembled state, both support elements 5, 10 as well as the spacer component 15 are operatively or electrically interconnected with one another by means of plated-through electrical connection locations or terminals 1, 1'; 2, 2'; 3, 3' and 4, 4':Corresponding electrical leads or conductors 16, 17, 17' and 18 are conducted to the individual connection locations or terminals, as schematically shown in FIG. 2.

Figure 9:
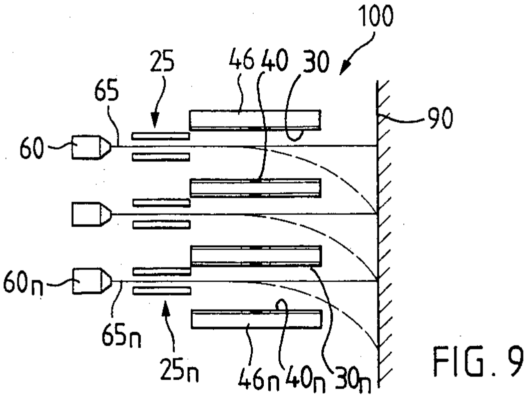
FIG. 9 schematically shows an arrangment for an ink jet printer formed from a plurality of adjacently arranged modules of adjacently arranged ink droplet generators and ink jet propulsion members or nozzles.

An arrangement 100 is schematically shown in FIG. 9 which is formed from a plurality of individual ink droplet generators 50 as hereinbefore described. This arrangement 100 also comprises a plurality of ink jet propulsion members or nozzles 60 through **60*n*, a plurality of first modules 25 through 25*n* as well as a plurality of second modules 46 through 46*n*. The ink droplets from the ink jet propulsion members or nozzles 60 through 60*n* represented by the lines 65 through 65*n* are charged and monitored or detected in each respective first module 25 through 25*n* and deflected in each respective second module 45 through 45*n* to an associated recording medium 90. In this embodiment it is necessary that the not particularly designated support elements 30 through 30*n* and 40 through 40*n* of the second modules 46 through 46*n* be provided with metal coating or plating on both sides and that each side oriented parallel to the trajectory of the ink droplets be provided with not particularly shown and not particularly designated conductive traces or current paths. These conductive traces or current paths are formed analogously to the conductive traces or current paths 31', 41' of the second module 45**.

While there are shown and described present preferred embodiments of the invention, it is to be distinctly understood that the invention is not limited thereto, but may be otherwise variously embodied and practiced within the scope of the following claims.

Accordingly, what we claim is:

1. A method for fabricating components of an ink droplet generator for generating a succession of charged, detected and deflected ink droplets for an ink jet printer, comprising the steps of:

removing unrequired electrical conductive coating from metallically coated elements to form a desired configuration of mutually isolated means for charging, detecting and deflecting ink droplets;

configuring a first means of said means as charging electrodes, a second means of said means as detection electrodes and a third means of said means as deflection electrodes;

applying a surface medium resistant to organic and inorganic media at least to a side of each of said first, second and third means which is wetted by an ink droplet medium of the ink jet printer;

said charging electrodes and said detection electrodes being formed upon a first surface of a double-sided coated support element;

a metallic coating of a second surface of said double-sided coated support element being configured and employed as electromagnetic shielding for said charging electrodes and said detection electrodes;

said deflection electrodes being formed, conjunctively with therewith associated conductor traces, from a single-sided coated foil and a foil applied thereto; and said deflection electrodes being applied in sandwich construction to a substrate provided as a support element.

2. The method as defined in claim 1, wherein:

said surface medium is a foil.

3. The method as defined in claim 1, wherein:

said surface medium is an insulating layer.

4. The method as defined in claim 1, wherein:

each said double-sided coated support element provided with said applied foils is fabricated as a hermetically sealed module in multi-layer technology.

5. The method as defined in claim 4, wherein:

said applied foil is a polyimide foil.

6. A method for fabricating an ink droplet generator for an ink jet printer in which a succession of ink droplets is charged, monitored and deflected, comprising the steps of:

forming and appropriately configuring mutually electrically isolated charging electrode means for imparting an electrostatic charge to the ink droplets, by removing undesired portions of a conductive superstrate of at least one metallically coated board-like support element;

forming and appropriately configuring mutually electrically isolated detection electrode means for monitoring the ink droplets, by removing undesired portions of the conducting superstrate of said at least one metallically-coated board-like support element;

formed and appropriately configuring mutually electrically isolated deflection electrode means for deflecting the ink droplets into a desired trajectory, by removing undesired portions of a conducting superstrate of at least one metallically coated foil:

each of said charging electrode means, said detection electrode means and said deflection electrode means having a side in the ink jet printer which is wetted by the ink droplets;

applying a protective layer resistant to organic and inorganic agents to said wetted sides;

said at least one metallically coated board-like support element comprising electrically conductive superstrates on first and second surfaces of an electrically insulative rigid substrate;

said step of forming said charging electrode means comprising forming a charging electrode upon said first surface of said at least one metallically coated board-like support element;

said step of forming said detection electrode means comprising forming a detection electrode upon said first surface of said at least one metallically coated board-like support element;

a further method step comprising configuring and employing said electrically conductive superstrate of said second surface of said at least one metallically coated board-like support element as electromagnetic shielding means for said charging electrodes and said detection electrodes;

said at least one metallically coated foil comprising an electrically conductive superstrate on a first surface only of at least one electrically insulative foil substrate as well as at least one covering foil applied thereover;

providing at least one support element in the form of a rigid substrate;

said step of forming said deflection electrode means comprising forming at least one deflection electrode conjointly with electrically conductive traces associated therewith upon said first surface of said at least one electrically insulative foil by removing undesired portions of said electrically conductive superstrate; and a further method step comprising applying said at least one deflection electrode in sandwich construction to said at least one support element in the form of a rigid substrate.

7. The method as defined in claim 6, wherein:

said protective layer comprises a foliate material.

8. The method as defined in claim 7, wherein:

said protective layer is electrically insulative.

9. The method as defined in claim 6, comprising the further step of:

fabricating said at least one metalically coated board-like support element provided with an applied protective foliate material as well as fabricating said at least one support element in the form of a rigid substrate provided with said applied at least one deflection electrode formed upon said first surface of said at least one electrically insulative foil with said at least one covering foil applied thereto as hermetically sealed modules in multi-layer technology.

10. The method as defined in claim 9, wherein:

said foliate material, said at least one electrically insulative foil and said at least one covering foil are polyimide foils.

11. An ink droplet generator for generating a sequence of charged, detected and deflected ink droplets, comprising:

a first module having a first spacer component and two first panel-like support elements arranged in mutually spaced relationship by said first spacer component;

said two first panel-like support elements being provided with charging and detecting electrodes;

a second module having a second spacer component and two second panel-like support elements arranged in mutually spaced relationship by said second spacer component;

said two second panel-like support elements being provided with deflection electrodes;

a first support element of said two first panel-like support elements comprising a charging electrode of said charging electrodes and a detection electrode of said detection electrodes for a first potential;

a second support element of said two first panel-like support elements comprising a charging electrode of said charging electrodes and a detection electrode of said detection electrodes for a second potential;

said first and second support elements of said two first panel-like support elements and said first spacer component being electrically operatively interconnected by means of plated-through terminals; and said charging electrodes and said detection electrodes being arranged substantially in mirror-image relationship to one another in an assembled state thereof for forming said first module.

12. The ink droplet generator as defined in claim 11, comprising:

a plurality of first modules serially arranged and substantially comprising said first two panel-like support elements;

a plurality of second modules serially arranged and substantially comprising said second two panel-like support elements; and said second modules being fabricated in sandwich construction and having interior modules and outer modules and with at least said interior modules being arranged between said two outer modules and with at least said interior modules containing a conductor trace for electrical connections on each side thereof.

13. An ink droplet generator for generating a sequence of charged, detected and deflected ink droplets, comprising:

a first module having a first spacer component and two first panel-like support elements arranged in mutually spaced relationship by said first spacer component;

said two first panel-like support elements being provided with charging and detecting electrodes;

a second module having a second spacer component and two second panel-like support elements arranged in mutually spaced relationship by said second spacer component;

said two second panel-like support elements being provided with deflection electrodes;

a first support element of said two second panel-like support elements comprising a first deflection electrode of said deflection electrodes for a first potential;

a second support element of said two second panel-like support elements comprising a second deflection electrode of said deflection electrodes for a second potential; and said first and second deflection electrodes being arranged substantially in mirror-image relationship to one another in an assembled state thereof for forming said second module.

14. The ink droplet generator as defined in claim 13, comprising:

a plurality of first modules serially arranged and substantially comprising said first two panel-like support elements;

a plurality of second modules serially arranged and substantially comprising said second two panel-like support elements; and said second modules being fabricated in sandwich construction and having interior modules and outer modules and with at least said interior modules being arranged between said two outer modules and with at least said interior modules containing a conductor trace for electrical connections on each side thereof.

15. An ink droplet generator of an ink jet printer for generating a succession of charged, monitored and deflected ink droplets, comprising:

a first module comprising a first spacer component and first and second rigid support panels arranged in mutually spaced relationship by said first spacer component;

a first charging electrode for imparting an electrostatic charge to the ink droplets and a first detection electrode for detecting the electrostatically charged ink droplets both formed in mutual electrical isolation upon a first side of said first rigid support panel of the first module;

a second charging electrode for imparting an electrostatic charge to the ink droplets and a second detection electrode for detecting the electrostatically charged ink droplets both formed in mutual electrical isolation upon a first side of said second rigid support panel of the first module;

a second module comprising a second spacer component and third and fourth rigid support panels arranged in mutually spaced relationship by said second spacer component;

a first deflection electrode for deflecting the electrostatically charged ink droplets into a desired trajectory and formed upon said third rigid support panel of the second module; and a second deflection electrode for deflecting the electrostatically charged ink droplets into a desired trajectory and formed upon said fourth rigid support panel of the second panel.

16. The ink droplet generator as defined in claim 15, wherein:

a first electrical potential being applied to said first charging electrode;

a second electrical potential being applied to said second charging electrode;

a third electrical potential being applied to said first detection electrode;

a fourth electrical potential being applied to said second detection electrode;

said first and second support panels being assembled together to form said first module such that said first charging electrode and said first detection electrode are arranged in substantially mirror-image relationship to said second charging electrode and said second detection electrode, respectively; and said first and second rigid support panels and said first spacer component being electrically interconnected by plated-through connection means.

17. The ink droplet generator as defined in claim 16, wherein:

said first and third electrical potentials are substantially equal.

18. The ink droplet generator as defined in claim 16, wherein:

said second and fourth electrical potentials are substantially equal.

19. The ink droplet generator as defined in claim 16, wherein:

a first electrical potential being applied to said first deflection electrode;

a second electrical potential being applied to said second deflection electrode; and said third and fourth rigid support panels being assembled together to form said second module such that said first deflection electrode is arranged in substantially mirror-image relationship to said second deflection electrode.

20. The ink droplet generator as defined in claim 15, further including:

a plurality of said first modules arranged in serial spatial relationship and each substantially comprising said first and second rigid support panels;

a plurality of said second modules arranged in serial spatial relationship and each substantially comprising said third and fourth rigid support panels;

said second modules being fabricated in sandwich construction;

said plurality of second modules comprising two outer second modules and at least one inner second module arranged therebetween; and at least said at least one inner second module comprising at least one electrically conductive trace on each surface of each said third and fourth rigid support panel for electrical conduction.

21. The ink droplet generator as defined in claim 15, further including:

electromagnetic shielding means formed upon a second side of said first rigid support panel; and electromagnetic shielding means formed upon a second side of said second rigid support panel.

* * * * *